United States Patent [19]
Saidel

[11] 3,949,458
[45] Apr. 13, 1976

[54] METHOD OF FORMING PALLET STRUCTURE

[76] Inventor: William R. Saidel, 3427 Vollmer Road, Flossmoor, Ill. 60422

[22] Filed: Feb. 20, 1975

[21] Appl. No.: 551,426

Related U.S. Application Data

[63] Continuation-in-part of Ser. No. 408,615, Oct. 23, 1973, Pat. No. 3,867,887, which is a continuation-in-part of Ser. No. 239,682, March 30, 1972, abandoned.

[52] U.S. Cl. ................. 29/416; 29/33 K; 29/200 R; 29/430; 29/526
[51] Int. Cl.$^{2}$ .......................................... B23P 17/00
[58] Field of Search ............ 29/416, 430, 526, 33 K, 29/33 P, 200 R; 108/51–58, 91; 229/6 A, DIG. 11; 206/60 A, 65 K; 220/97 C, 97 R, 97 D, 23

[56] References Cited

UNITED STATES PATENTS

| | | | |
|---|---|---|---|
| 1,917,506 | 7/1933 | Deline | 229/6 A |
| 2,409,027 | 10/1946 | Fergusson | 108/91 |
| 2,779,487 | 1/1957 | Harris | 108/53 X |
| 3,393,858 | 7/1968 | Heel | 229/6 A X |
| 3,557,439 | 1/1971 | Dykeman | 29/430 |
| 3,613,941 | 10/1971 | Koranyi | 29/416 X |

FOREIGN PATENTS OR APPLICATIONS

| | | | |
|---|---|---|---|
| 732,022 | 4/1966 | Canada | 108/53 |

*Primary Examiner*—Victor A. Di Palma
*Attorney, Agent, or Firm*—Olson, Trexler, Wolters, Bushnell & Fosse, Ltd.

[57] ABSTRACT

The invention disclosed herein comprises a pallet construction and method of forming the same. A support member has a plurality of apertures arranged in rows and columns. The struck-out portions obtained when forming the apertures are gathered and secured together for use as legs on the support member. The corner portions and central marginal portions as well as the center of the support member are free of apertures and the support legs are secured in these areas to form the pallet structure. These support legs are secured to the planar member in alignment with the rows and columns of apertures so that stacking of the pallets can be accomplished by inserting the legs of one pallet into the holes of an adjacent pallet. Removable stand offs can be formed from the struck-out portion to provide additional legs or removable main support legs.

13 Claims, 19 Drawing Figures

METHOD OF FORMING PALLET STRUCTURE

REFERENCE TO RELATED APPLICATIONS

This is a continuation-in-part of my copending application Ser. No. 408,615, now U.S. Pat. No. 3,867,887, filed Oct. 23, 1973, which was a continuation-in-part of a previous copending application Ser. No. 239,682, filed Mar. 30, 1972, now abandoned.

BACKGROUND OF THE INVENTION

The present invention relates generally to load carrying pallets and more particularly to a novel strong lightweight nestable pallet structure and method of making the same, which utilizes and thereby eliminates what would otherwise be waste material cut from a blank of stock material.

Pallet structures presently in general use are relatively heavy and bulky. These structures are usually made so that when stacked for storage or shipping, the stack will have a height at least as great as the combined total thicknesses of all of the pallets in the stack. Thus, the weight and space required for such pallets is unnecessarily great so as to increase shipping and storage costs.

Nestable pallet structures have been proposed, but such proposals have usually contemplated the use of hollow members or legs. Such heretofore proposed pallets may not have sufficient strength and rigidity to be useful for many purposes.

SUMMARY OF THE INVENTION

Accordingly, it is an important object of the present invention to provide a novel pallet construction which may be simply and economically manufactured from a blank of stock material and which is made so that all of the material of the blank can be used thereby to eliminate waste and provide the final pallet construction with maximum strength and rigidity for a given blank.

It is a further important object of the present invention to provide a novel pallet having legs or support members of increased strength and rigidity while at the same time the pallet is constructed so as to facilitate nesting with a plurality of similar pallets for more compact storing or shipping.

A more specific object of the present invention is to provide a novel pallet formed from a blank of suitable material such as particle board, plywood and the like in a manner to provide both solid legs or support members for increased strength and rigidity and nestability.

Another important object of the present invention is to provide a novel pallet constructed as described above so as to have maximum strength and rigidity by utilizing all material of a given blank and nestability, and further constructed in a manner such that legs of one pallet may be inserted through apertures formed in an adjacent pallet during nesting or stacking without interfering with the legs of the other pallet.

A still further object of the present invention is to provide a novel pallet as set forth in the preceding paragraph which is constructed so that a plurality of the pallets may be stacked as high as desired and in a predetermined symmetrical and uniform pattern which facilitates removal of the pallets from the stack by means of automatic machinery, if desired, for successive delivery of the pallets to a loading station.

Yet another object of the present invention is to provide a novel pallet construction which can also be made from a plurality of boards secured together and having certain ones of said boards provided with apertures to form pucks to be used for forming legs for the pallet construction.

Another object of the present invention is to provide a novel method of manufacturing a pallet of the above-described type in a rapid, efficient and economical manner.

Briefly, the pallet structure of this invention is formed of a blank planar member which provides a load receiving support plate of the pallet. A plurality of uniformly spaced struck-out portions are removed from the pallet thereby leaving behind apertures arranged in rows and columns. This reduces the weight of the support plate. The struck-out portions are then stacked in laminate columns and secured to one side of the support plate to form legs at desired locations also uniformly spaced from the apertures. By so arranging the apertures formed in the planar member and by so positioning the legs on the planar member, the completed pallet structures can be stacked one on top of the other in a minimum of space since the legs of one pallet will telescope into corresponding apertures in the other pallets. Such utilization of the struck-out portions eliminates waste and provides solid legs for maximum strength and rigidity from a given blank.

Many other objects, features and advantages of this invention will be more fully realized and understood from the following detailed desciption when taken in conjunction with the accompanying drawings wherein like reference numerals throughout the various views of the drawings are intended to designate similar elements or components.

DETAILED DESCRIPTION OF THE ILLUSTRATED EMBODIMENTS

Figure 1:
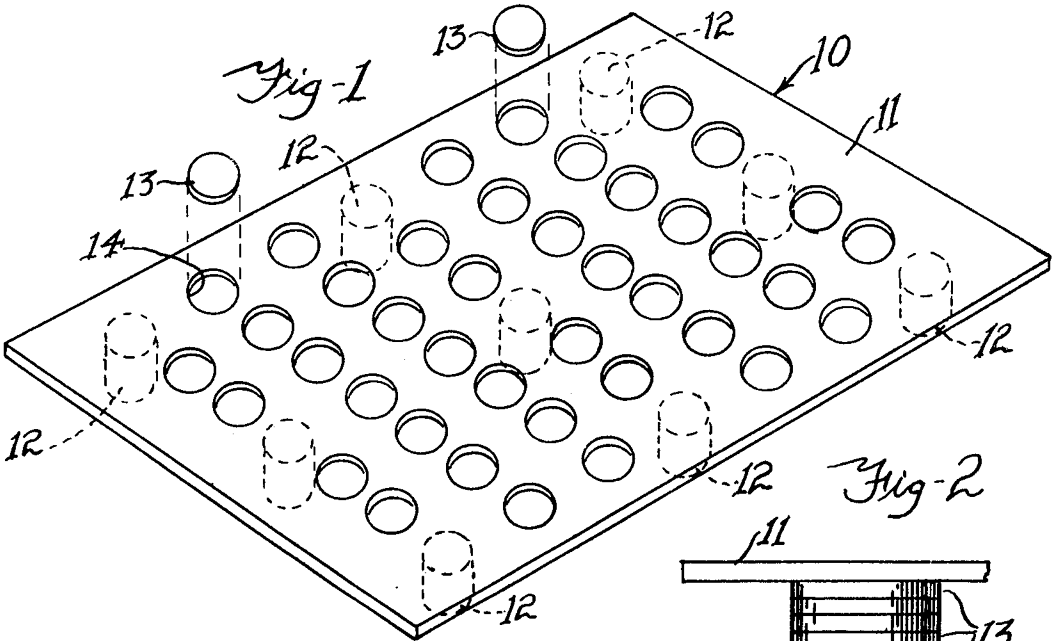
FIG. 1 is a perspective view showing a pallet constructed in accordance with the principles of this invention.
Figure 2:
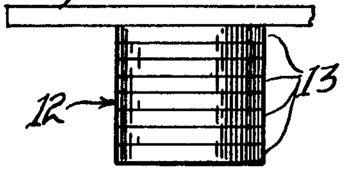
FIG. 2 is a fragmentary elevational view showing a leg made from the struck-out portions of the pallet of FIG. 1.

Referring now to FIG. 1 there is seen a pallet constructed in accordance with the principles of this invention and designated generally by reference numeral 10. The pallet 10 is formed of a planar member 11 having a plurality of downwardly extending legs 12 at predetermined locations on the planar member. A plurality of struck-out portions 13, only two of which are shown, are obtained by cutting, punching, sawing, routing, laser rays, or any other means may be used to form a corresponding plurality of apertures 14. The struck-out portions 13 are then arranged in stacks and secured together by glue, nails, or bolt means to form the legs 12. This is best illustrated in FIG. 2 which shows eight such struck-out portions 13 stacked together to form the leg 12. It will be noted that the legs 12 are solid for maximum strength and rigidity.

Figure 8:
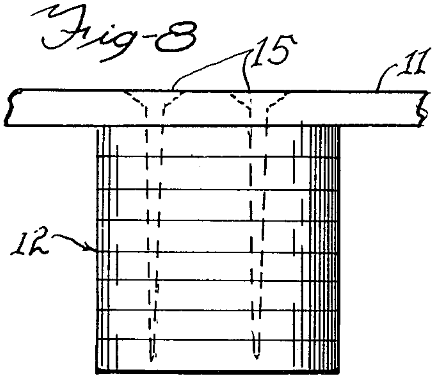
FIG. 8 is a view similar to FIG. 2 but showing a slightly modified embodiment.

As shown in FIG. 2, the legs 12 may be glued to the pallet board 10. Alternatively or in addition to the glue, fasteners such as nails 15 or bolts may be driven through the board and axially through a plurality of the discs along a substantial length of the legs as shown in FIG. 8. Such nails not only secure the legs to the board, but also protect the legs against breakage in the event the pallet is subjected to side thrusts or shocks during handling or shipping.

Figure 9:
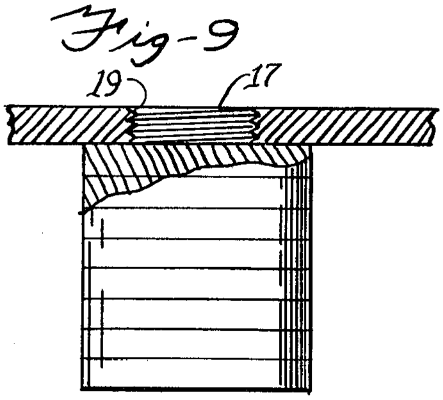
FIG. 9 is similar to FIG. 8 but shows another modified form of this invention.
Figure 10:
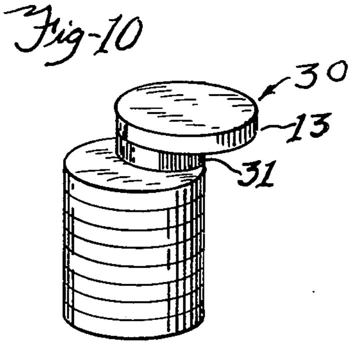
FIG. 10 is a perspective view of a stand off post structure which can be added to the pallet construction of this invention as a detachable unit.
Figure 11:
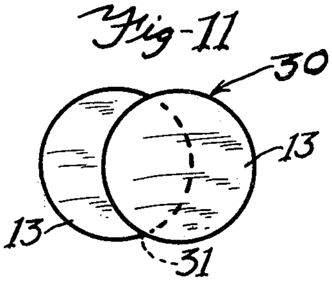
FIG. 11 is a top view of the stand off post of FIG. 10.
Figure 12:
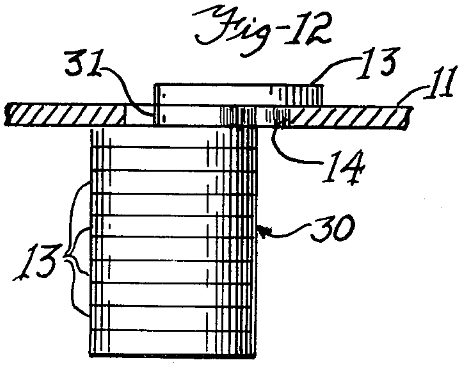
FIG. 12 is a fragmentary sectional view showing the stand off post connected through an aperture of the pallet of this invention.
Figure 13:
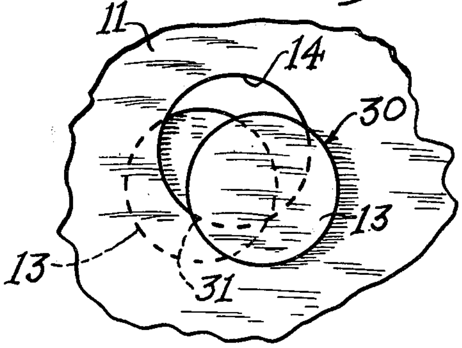
FIG. 13 is a top view of the stand off post and pallet shown in FIG. 12.

Still another leg attachment means is shown in FIG. 9. In this embodiment the leg is formed with a threaded stud 17 at its upper end and the pallet board is formed with a complementary internally threaded aperture 19.

The apertures 14 formed in the planar member 11 are arranged in rows and columns of any desired number. For example, there can be formed a pallet structure having six rows with nine apertures in each and three rows with six apertures in each giving a total of 72 apertures and 72 struck-out portions. When there are nine legs to each pallet the 72 struck-out portions will allow eight discs per leg. If the pallet structure is made from ⅝ inch thick particle board or plywood material, eight such discs would form a five inch high leg. If a shorter leg is satisfactory for a particular use, the number of holes in the planar member can be reduced whereby the strength and rigidity of the planar member will be increased. On the other hand, the pallet structure can be formed having eight rows with nine apertures each and three rows with six apertures each thereby providing a total of 90 holes. This produces ninety struck-out portions so that each leg will be formed of ten such discs and will be increased in height. For each row of nine apertures formed there will be nine struck-out portions. Therefore, one struck-out portion or disc can be added to each leg structure to make it still higher. Any desired number of rows and columns can be incorporated in the pallet structure of this invention as desired as long as the holes are arranged to permit stacking as described in detail below.

Figure 3:
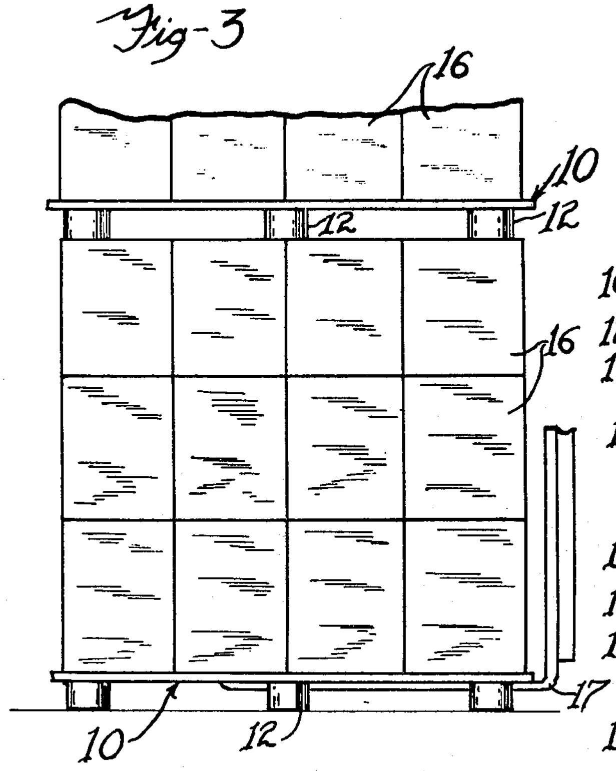
FIG. 3 illustrates cartons stacked onto pallets of this invention.

Referring now to FIG. 3 two pallet structures 10 are shown supporting a plurality of cartons 16 in a stacked position. A portion of a fork lift 17 is illustrated having the lifting forks thereof inserted beneath the lowermost pallet to raise the pallet to a new position. In this instance the cartons are sufficiently strong and the load relatively light in weight. Therefore, the legs 12 afford sufficient surface area to adequately support the upper pallet weight without crushing the top cartons on the lower pallet.

Figure 4:
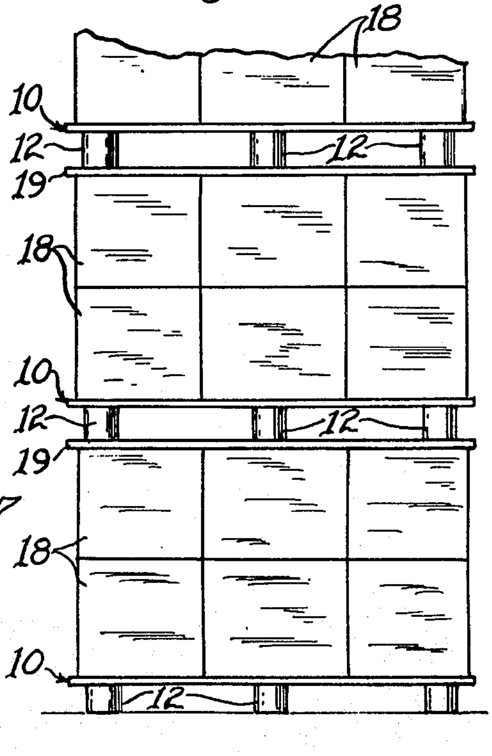
FIG. 4 illustrates cartons stacked onto pallets of this invention wherein slats are positioned between the pallet leg and the carton top.

Referring now to FIG. 4 a plurality of cartons 18 are shown on the pallets 10, these cartons 18 being relatively heavy in weight. When heavy cartons are involved, the legs 12 may tend to crush or pierce through the upper carton on the lower pallet. Therefore, slats 19 are secured to the lower ends of each row of legs 12. This will distribute the weight of the upper pallets more evenly and prevent crushing or other damage to the top cartons of the lower pallets. The slats can be provided separately and then nailed or otherwise secured in place by the pallet user so that the pallets can be shipped or stored in a compact stack as discussed fully below.

Figure 5:
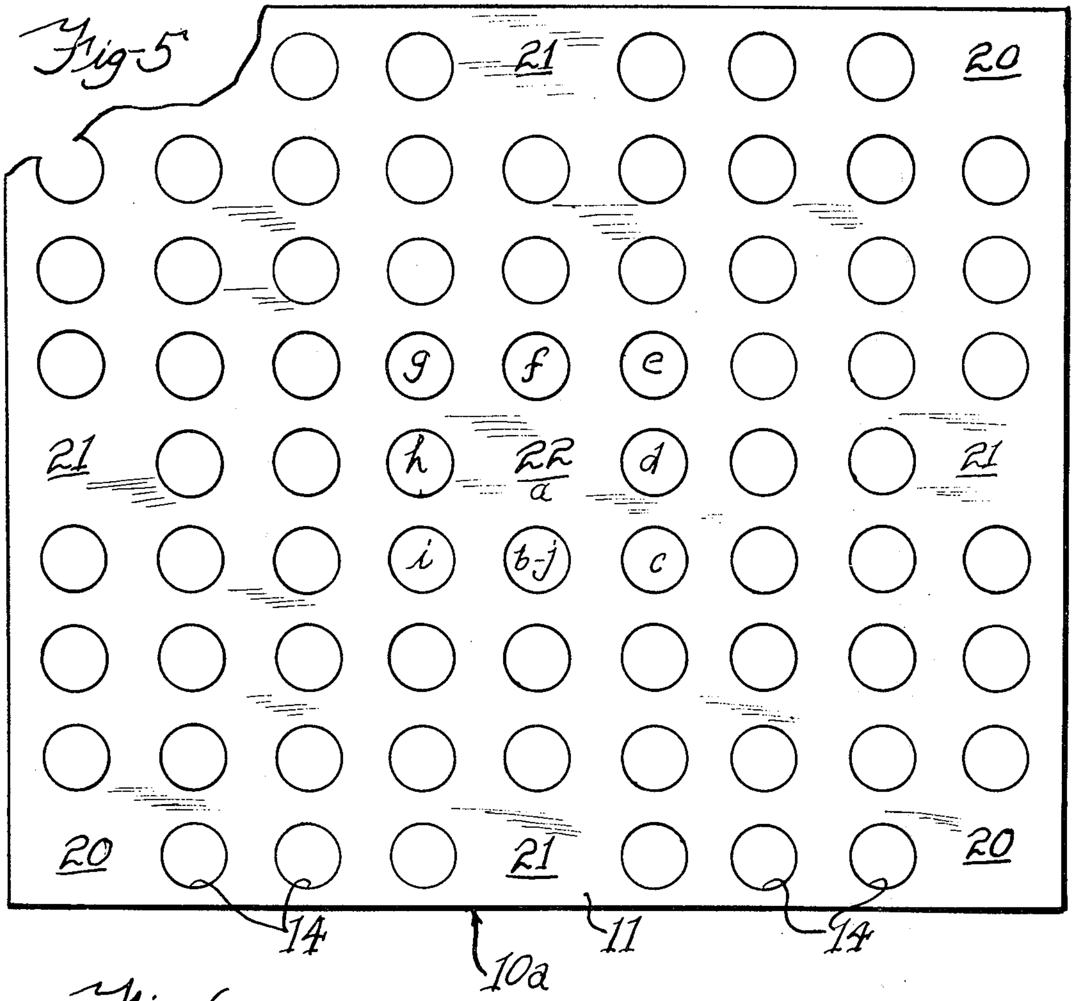
FIG. 5 is an enlarged plan view showing the arrangement of apertures formed in the planar member of the pallet.

Referring to FIG. 5 there is seen the details of construction of the planar member 11. Here the plurality of rows and columns of apertures 14 are shown with the corner portions 20 thereof free of apertures. Also the central marginal portion 21 along each side of the planar member are free of apertures and similarly the center 22 is free of an aperture. Therefore, the legs formed by stacking the discs obtained by the struck-out portions 13 are positioned at these locations, i.e., 20, 21 and 22, so that they are in alignment with the corresponding rows and columns. When a plurality of such pallets are stacked one on top of the other, the legs will fit through certain ones of the apertures of the other pallets to allow the planar member of one pallet to rest completely upon the planar member of the next pallet.

Figure 6:
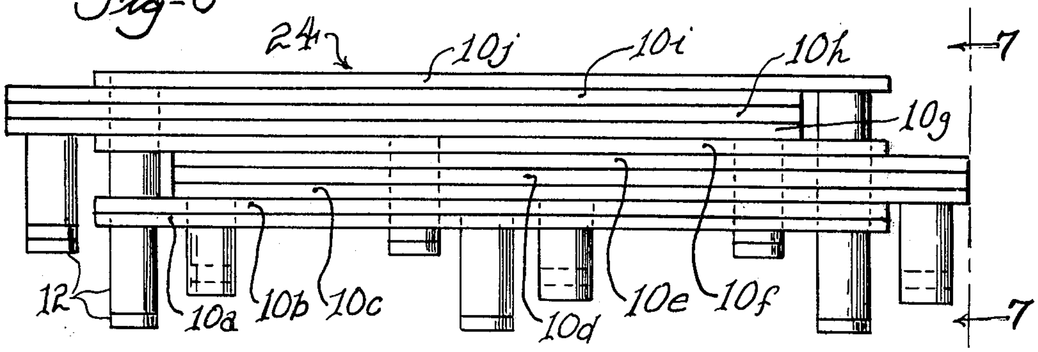
FIG. 6 is an end view of a plurality of pallets stacked in accordance with this invention.
Figure 7:
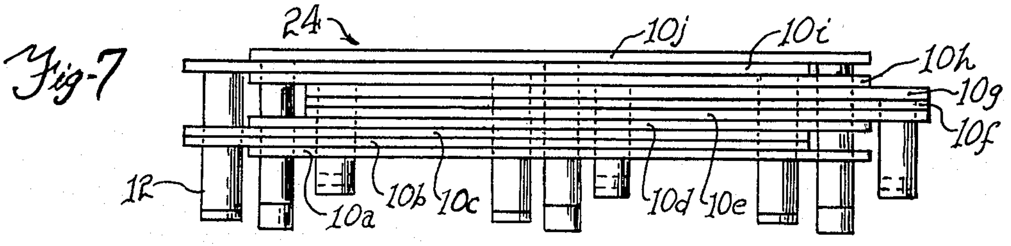
FIG. 7 is a side view of the stacked pallets of FIG. 6 as taken along line 7—7.

FIGS. 6 and 7 illustrate a stack of pallets designated generally by reference numeral 24. Each of the pallets in the stack 24 is designated by a subscript in accordance with its position in the stacks starting with subscript *a* at the bottom to subscript *j* at the top of the stack, it being understood that any number of pallets can be stacked in this manner. The pallet **10*a* is positioned on the floor and the second pallet 10*b* is positioned over the pallet and displaced forwardly thereof, as seen in FIG. 6, so that some of the legs of the pallet 10*b* fit through the apertures of the pallet 10*a* and the legs along one edge extend over the marginal portion of the lower pallet. The positions of the legs of the stacked pallets with respect to pallet 10*a*** are shown by the positions of the subscripts *b–j* in FIG. 5.

In the preferred arrangement shown in FIGS. 5–7, the stacked pallets are spirally arranged with the legs of units **10*b* through 10*i* disposed in a circle around the legs of pallet 10*a*. Pallet 10*j* provides the start of a second group and, as shown, is in alignment with pallet 10*b*. Because the height of the legs is equal to or less than the combined thickness of seven of the pallet planar members, the legs of pallet 10*j* do not interfere with the lower pallet 10*b*.** Thus, the pattern of stacked pallets may be repeated over and over again, and the stack can be made as high as desired.

The described preferred repeating spiral pattern of the stacked pallets provides a sequential arrangement which will facilitate the use of the pallets in an automatic packaging or material handling system. For example, it is contemplated that apparatus may be provided for feeding the pallets from either the top or bottom of the stack to a station at which the pallets are to be loaded. The preferred stack arrangement simplifies the structure and operation of such feeding apparatus since the successive pallets are substantially uniformly positioned with respect to each other. The preferred arrangement also provides a compact symmetrical stack which is relatively rigid and stable. The pattern of stacking can be varied in certain situations, but in any event the pattern is such that the overall transverse dimensions of the stack exceeds the width and length of the first pallet only by the distance between the holes surrounding the center portion 22 of the first pallet.

Referring now to FIGS. 10, 11, 12 and 13 there is seen a stand off post structure designated generally by reference numeral 30. The stand off post structure 30 can be formed of a plurality of struck-out portions 13 in the same manner as the legs 12 of the pallet. However, a reduced dimension section 31 is placed immediately under the uppermost disc 13 and the uppermost disc is offset from the other discs of the stack as shown. The stand off structure 30 is insertable through an aperture 14 of the planar member 11 so that the reduced dimension portion 31 is in substantial registry with the thickness of the planar member, this being illustrated in FIG. 12. The stand off structure is then rotated so that the stand off member 30 is held firmly in position on the planar member. The stand off members 30 can be attached to the planar member so that they extend upwardly to provide spacing elements for a plate or the like positioned over the pallet. Also the stand off members 30 can be connected to the planar member to form the support legs therefor, this being either additional support legs or forming the primary support legs as desired. When stand off post members 30 are used as the primary support legs, the pallet structures can be stored or shipped by merely stacking the planar members one on top of the other in registry and providing the stand off support members in a separate carton or other container. When the pallet is to be used to support cartons or the like as shown in FIGS. 3 and 4, the stand off support legs are quickly fastened to the planar members by insertion and partial rotation as described above.

Figures 14A, 14B, 17B:
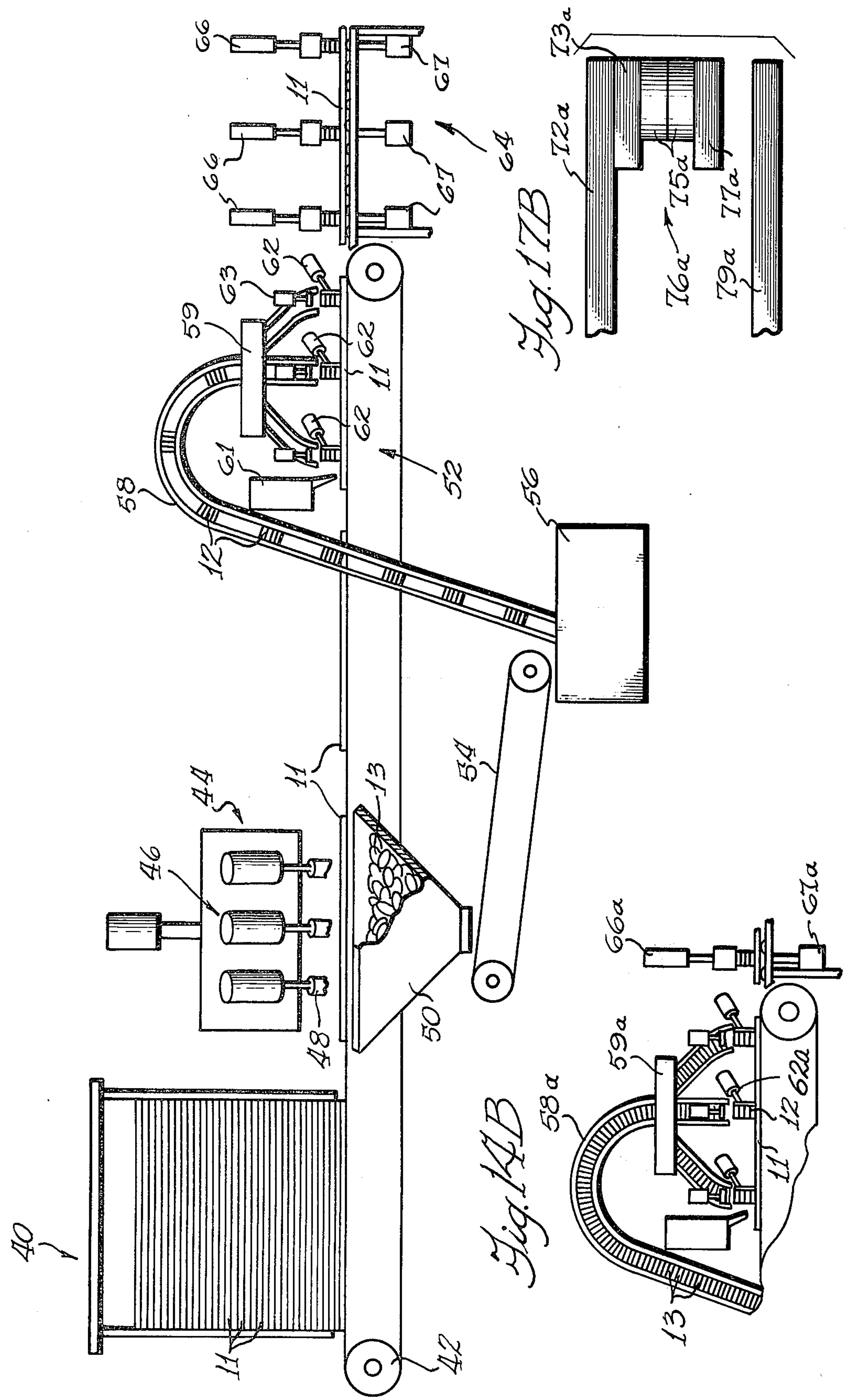
FIG. 14A is a schematic view of an apparatus for carrying out a method of making pallets in accordance with this invention.
FIG. 14B is a fragmentary portion of the apparatus of FIG. 14A showing an alternate embodiment thereof.
FIG. 17B is a fragmentary portion of the pallet construction of FIG. 17A showing an alternate embodiment thereof.
Figure 15:
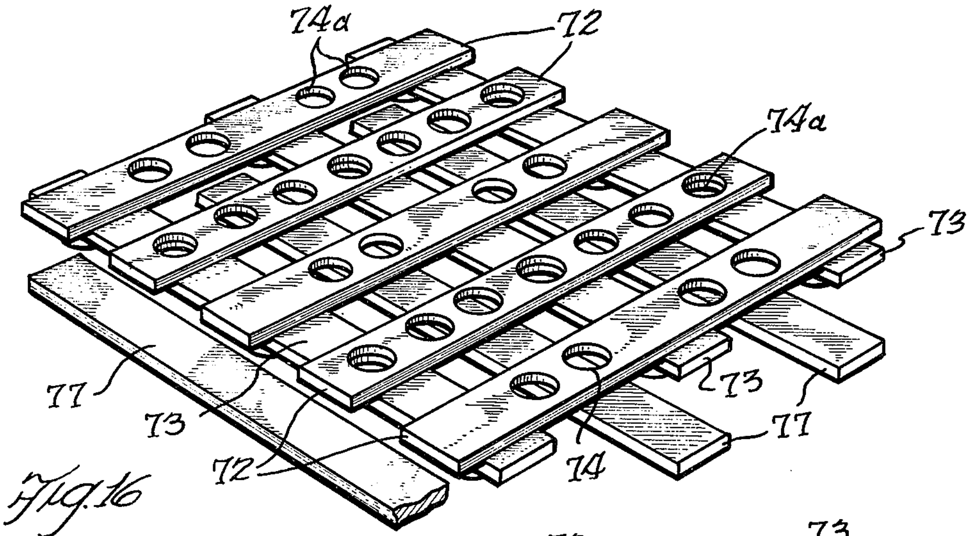
FIG. 15 is a perspective view of an alternate embodiment of a pallet constructed in accordance with the principles of this invention.
Figure 16:
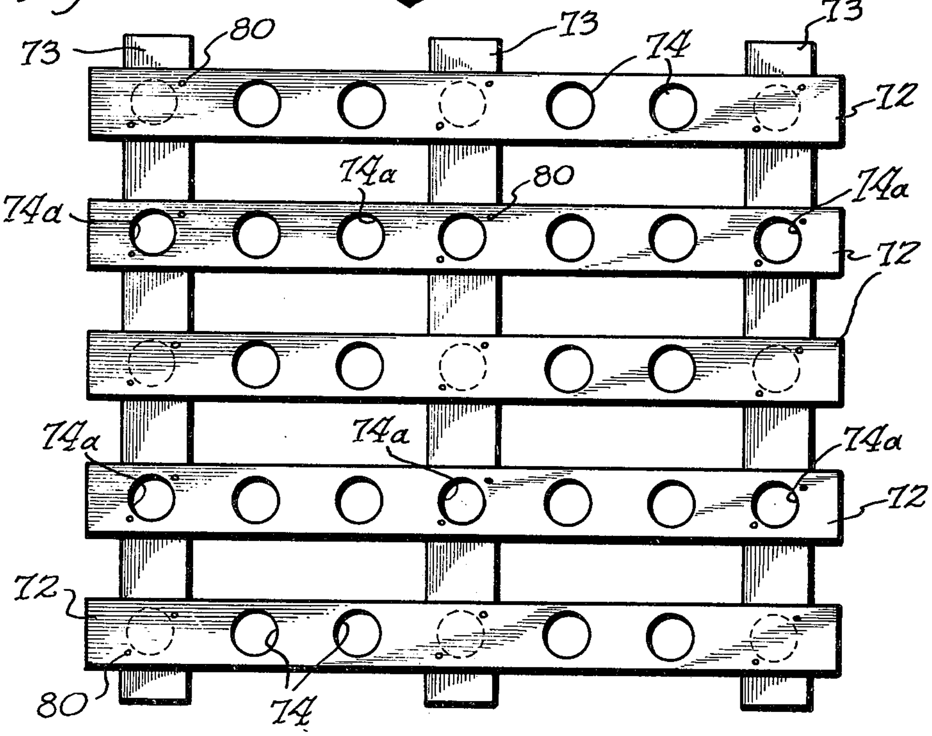
FIG. 16 is a plan view of the pallet construction of FIG. 15.
Figure 17A:
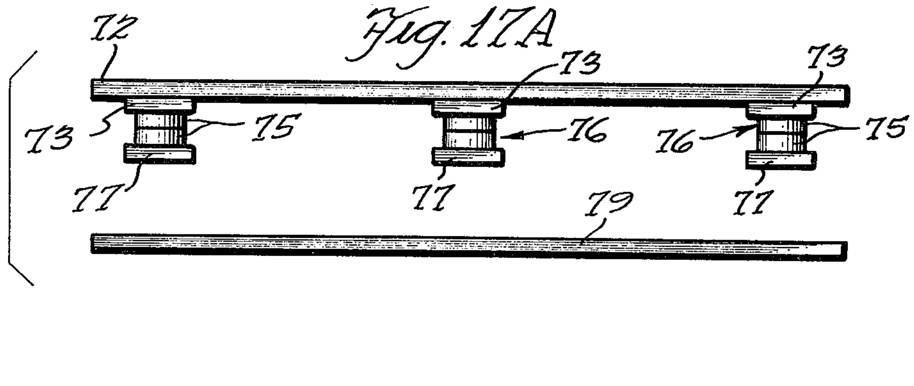
FIG. 17A is an end view of the pallet construction shown in FIGS. 15 and 16.

Referring now to FIGS. 15, 16 and 17, another embodiment of a pallet structure incorporating features of the present invention is shown. Here the pallet structure and includes an upper support or planar member formed of a plurality of boards 72 and 73 arranged in two groups. In the embodiment shown for purposes of illustrating the invention, the group of boards 72 includes five in number and the boards are disposed in a common plane and preferably in spaced-apart substantially parallel relationship so as to provide a substantially flat broad deck structure. The boards 73, on the other hand, are, spaced-apart a further distance than the boards 72 and are fastened to the underside of the boards 72 in order to secure the boards into a rigid, strong planar member or deck structure.

A plurality of apertures 74 is formed in the boards, selectively in any of the patterns and numbers described above with respect to the pallets of FIGS. 1–9. It is to be noted that certain of the apertures 74, such as apertures 74*a*, may be formed in portions of the boards 72 which cross portions of the boards 73 and these apertures are formed so as to extend through such portions of the boards 73. One or more nails 80 or other fasteners are used at each intersection of the boards 72 and 73 to secure the boards together and these fasteners are offset so as to avoid interference with the holes 74*a*. Pucks or disks 75 corresponding to the above-described disks 13 are provided by material cut away to form the apertures. It is noted that for each aperture 74*a*, two pucks or disks will be formed. One from the boards 72 and one from the boards 73.

The pucks or disks are gathered as described above to form legs 76. These legs are secured to non-perforated portions of the boards 73 in any of the patterns previously described and in accordance with the pattern of the apertures 74 so that nesting of a plurality of the pallets may be obtained. The legs are secured by nails or staples or other desired fasteners and in addition may be glued to the boards 73 of the planar member as will be described below. If desired, runners may be secured to the bottom ends of the legs to provide a wider area of distribution of the forces exerted by the pallet when loaded and to form a more rigid pallet construction. While the runners may be omitted, in the embodiment shown, the runners 77 are disposed so as to extend substantially parallel to the longitudinal axes of the boards 72. However, the runners may be arranged parallel to the boards 73, if desired. Alternatively, an additional optional runner 79 may be secured to the bottoms of the runners 77 in a cross arrangement preferably about 90° with respect thereto. In the embodiment shown, the number of apertures 74 is sufficient to provide enough pucks or discs to form nine legs of at least two pucks each. The spacing between the top boards 72 and the floor or other surface on which the pallet rests or the optional runner 79 is equal to the thickness or heighth of the legs plus the thickness of the boards 73 and is sufficient to receive the tines of a fork-lift truck or the like.

FIG. 17B illustrates an alternate embodiment of the present invention. Here a fragmentary edge portion of the support deck 72*a* is shown having the edge board 73*a* secured to the upper board at the edge thereof. This then allows a plurality of pucks 75*a* to be stacked to form a leg 76*a* at the extreme edge as is shown in the drawings. This structure arrangement of a pallet may facilitate in warehousing and automatic palletizing of the pallet units. The bottom boards 77*a* can then be placed over the legs 76*a* as mentioned above with regard to FIG. 17A. The optional board 79*a* can also be used in the configuration of FIG. 17B.

Referring now to FIG. 14A, there is shown schematically an apparatus for carrying out one or more embodiments of the method of the present invention for the production of pallets. The method starts with providing a supply of support members 11 or 71 in the form of a stack on a feeding means 40. While the support members may be either planar members 11 as disclosed with regard to FIGS. 1 and 5 or fabricated support members 71 as disclosed in FIGS. 15, 16 and 17, it will be understood that other configurations of support members may be used. The support members are successively delivered by feeding means to a suitable conveying apparatus 42 which functions to advance the support member along a predetermined path of travel so that the support member can be located successively at different work stations. The support members are successively advanced to a first work station 44 at which is located a sawing mechanism 46 having a plurality of suitably driven annular saw elements 48 arranged in the same pattern as the apertures which are to be formed in the support member. When the support member reaches the work station 44, the sawing mechanism 46 is actuated so that the saws and the planar members are relatively moved together whereupon the saws 48 cut out the discs 13 to form the apertures 14, as seen in FIG. 1. In the alternative, the saw mechanism 46 may have an alternative pattern arrangement of the saws 48 to as to form a predetermined pattern of locations of apertures as set forth in FIG. 15.

It will be noted that while annular saws 48 of various constructions may be used, each saw will have a blade of substantial thickness which may, for example, be in the order of about one-sixteenth or one-eighth inch. The discs or pucks such as the discs 13 therefore have a diameter which is substantially less than the diameter of the aperture 14. When a plurality of pallets are stacked together with the legs formed by the discs inserted through the apertures, this difference in the diameters between the legs 12 and the apertures 14 provide a substantial clearance which may be in the order of one-fourth inch between the sides of the legs of one pallet and the edges of the apertures of an associated pallet. This clearance greatly facilitates the manufacturing of the pallets as set forth with regard to FIGS. 1 and 5.

In accordance with one method of the present invention, the struck-out portions or discs 13 drop from the support member as they are cut and are first gathered together in a collector 50 approximately located adjacent the sawing mechanism 46. Upon completion of the sawing operation, the support member is again moved by the conveying apparatus 42 along the path of travel thereof to a second work station designated generally by reference numeral 52. In addition, the discs 13 are carried along a second conveying path 54 from the collector 50 to a third work station 56, here illustrated as being remote from the conveying path, but it being understood that it can lie along the conveying path if desired. The discs are then arranged in columns and adhesively or otherwise secured together in appropriate numbers to form cylindrical legs of uniform length. This step can be accomplished manually, but preferably suitable means, not shown, are provided at the work station 56 for adhesively securing the discs 13 together and then delivering groups of these discs in the form of legs 12 to the work station 52 along a third conveying means 58.

The legs 12 are directed by the conveying means 58 to the work station 52 at which a distributing mechanism 59 is provided for delivering of a desired number of legs in the desired pattern to the support member 11. However, in one form of the illustrated embodiment, the legs 12 are disposed upon the support member in the desired pattern but displaced slightly from their desired location. During the transport of the support member 11 to the work station 52, glue-dispensing means 61 dispenses three spaced-apart quantities of glue on the surface of the support member to receive the legs. The glue dispenser 61 may include means for raising and lowering the dispensers during the dispensing operation. A plurality of transfer cylinders 62 then push the stacked legs transversely of the surface of the support member so that they are now in registry with the quantities of glue previously applied thereto and in the desired predetermined position, and pressure of clamping cylinders 63 are actuated to press the legs against the support member for enhancing the bond provided by the glue.

The support member 11, together with the legs 12 positioned at the desired locations thereof, is transported to another work station designated generally by reference numeral 64. At work station 64, hold-down cylinder means 66 are actuated to apply pressure to the legs over their glue position. Additionally, nailing means 67, located beneath the support table of the work station, drive securing nails upwardly through the support member and into the legs 12. In the alternate embodiment of the pallet construction wherein runner boards are secured to the leg, the hold-down cylinder means 66 may additionally include means for nailing or stapling downwardly, relative to the orientation of the components shown in FIG. 14 for securing the runners to the legs.

The support member and legs are then transported from the work station 64 to a stacking station, where, in the case of the pallet construction shown in FIGS. 1 and 5, the units are stacked together with the legs inserted through selected ones of a plurality of apertures, and in the case of the alternate pallet construction disclosed incorporating the runners stacked substantially in a conventional manner. Furthermore, at intermediate locations between work station and the stacking station, the previously mentioned optional runner boards across the bottom of the legs, oriented 90° to the runner boards associated therewith may be incorporated.

While it is contemplated that the discs or struck-out portions 75 removed from a particular support member may be assembled into legs and secured to that particular support member, it is also contemplated that during the process of manufacture of many pallets, the discs removed from one support member may well be secured to another support member, depending upon the time required to assemble the discs into legs as compared to, for example, the time required to advance the support member to the leg-securing station and to assemble and secure the legs at that station. In any event, a major portion, if not all of the discs cut from each support member is used to form the legs to be secured in the pallet construction so that waste is minimized. Furthermore, the overall length of the legs is such that a clearance is provided beneath the pallet support member for enabling handling by conventional fork-lift trucks and the like. In other words, it is contemplated that each of the legs will have at least two struck-out portions or discs so that the clearance beneath the support member will be such as will permit easy entry of the tines of a fork-lift truck. Thus, a large number of struck-out portions is required and while this number is such that a substantial portion of the area of the planar member is removed in the formation of the apertures, a major portion of the area remains, such as for example about 75–80 percent, to enhance the structural rigidity of the support member.

With regard to the embodiment of FIG. 15, the number of struck-out portions forming the legs may be reduced as longitudinal runners are also incorporated in the pallet structure to increase the overall spacing between the top support planar surface and the surface upon which the pallet member rests to receive the tines of a fork-lift truck.

Referring now to FIG. 14B there is seen an alternate embodiment of the apparatus illustrated in FIG. 14A. Here the conveying means 58*a* receives the pucks 13 in a continuous fashion and are divided among the distributing channels or conveying outlets thereof by means of a distributor unit 59*a*. In the embodiment shown in FIG. 14B, the pushers 62*a* may include a gate or support platform to hold the pucks 13 in their respective channels as the stack of pucks, forming the legs 12, are pushed laterally to be fastened by the units 66*a* and 67*a*.

While several embodiments of the invention are illustrated herein, it will be understood that other variations and modifications of the invention can be effected without departing from the spirit and scope of the novel concepts as disclosed and claimed herein.

I claim:

1. A method of making a plurality of pallet constructions comprising the steps of successively advancing a plurality of support members along a predetermined path of travel to a first work station, successively severing each of said support members when located at said first work station and thereby simultaneously forming a plurality of struck out portions from each of said support members while at said first work station and thereby forming apertures in each support member upon removal of the struck out portions in a first predetermined pattern, subsequently successively advancing each of the support members from said first work station along said path of travel and successively positioning each of said support members at a second work station, gathering struck out portions removed from the support members at said first work station, directing said struck out portions toward successive support members at said second work station, successively placing groups of said struck out portions on successive support members at said second work station in a second predetermined pattern relative to the support members to provide legs on the support members, and thereafter securing the legs to the support members.

2. The method of forming a pallet construction according to claim 1 wherein said plurality of legs are releasably secured to said support members.

3. A method of making a pallet construction comprising the steps of: advancing a support member along a predetermined path of travel to a first work station, simultaneously severing a plurality of struck-out portions from the support member and thereby forming apertures in the support member upon removal of the struck-out portions in a first predetermined pattern, subsequently advancing said support member from said first work station along said path of travel to a second work station, gathering the struck out portions removed from the support member at said first work station, directing said struck-out portions toward said support member at said second work station, placing said struck-out portions on said support member in a second predetermined pattern relative to the support member to provide legs on the support member, and thereafter securing the legs and the support member together.

4. A method as defined in claim 3 which includes accomplishing said severing of the struck-out portions by sawing said struck-out portions from the support member and thereby forming the struck-out portions with a diameter substantially less than the diameter of the apertures, grouping a plurality of the struck-out portions in each of said legs in substantial axial alignment for forming the legs into a cylindrical configuration of substantial uniform diameter throughout corresponding to the diameter of the struck-out portions, and arranging said legs in said second pattern so that certain ones thereof may be inserted into apertures of an associated similarly shaped pallet construction when a plurality of similarly shaped pallet constructions are stacked together.

5. A method as defined in claim 3 which includes the step of securing said struck-out portions together and forming groups including at least two of said struck-out portions for providing a plurality of legs prior to directing said struck-out portions to said support member at said second work station.

6. A method as defined in claim 3 which includes the step of dispensing discrete amounts of adhesive onto said support member in said second predetermined pattern prior to assembly of the legs with the support member, and then applying said legs to the adhesive material on the support member.

7. A method as defined in claim 6 wherein said legs are secured to said support member by nailing said legs thereto after being positioned in registry with the adhesive dispensed in said second predetermined pattern.

8. A method as defined in claim 6 wherein said legs are deposited upon said support member in another predetermined pattern and then shifted into registry with said dispensed adhesive in said second predetermined pattern, and further including the step of shifting said legs from their dispensed position to a final position in registry with the disposed adhesive prior to securing said legs to said support member.

9. A method as defined in claim 6 further including the step of securing a plurality of generally parallel spaced apart boards to ends of a like plurality of groups of aligned legs.

10. A method as defined in claim 9 further including the step of securing a second board across said first boards in the direction 90° relative thereto.

11. A method of making a pallet construction comprising the steps of: securing a plurality of boards in a criss-cross pattern for providing a support member, advancing said support member along a predetermined path of travel to a first work station, said plurality of boards comprising first and second groups, severing a plurality of struck out portions from said first group of said boards and forming apertures therein upon removal of the struck-out portions in a first predetermined pattern, advancing said support member from said first work station along said path of travel to a second work station, gathering said struck-out portions removed from said first group of boards of a support member at said first work station, directing said struck-out portions to said second work station to be positioned in a second predetermined pattern relative to said plurality of boards, holding said struck-out portions in said second predetermined pattern relative to said support member, and thereafter securing said stuck-out portions to said support member together to form legs thereon.

12. A method of making a pallet construction as set forth in claim 11 further including the step of securing said struck-out portions together and forming groups including at least two of said struck-out portions for providing a plurality of legs before they are directed toward said second work station.

13. A method of making a pallet construction as set forth in claim 11 wherein struck-out portions are also removed from said second group of boards at the cross-over point with said first group of boards to obtain struck-out portions of double thickness therefrom.

* * * * *

UNITED STATES PATENT OFFICE

CERTIFICATE OF CORRECTION

Patent No. 3,949,458 Dated April 13, 1976

Inventor(s) William R. Saidel

It is certified that error appears in the above-identified patent and that said Letters Patent are hereby corrected as shown below:

Col. 5, line 54, cancel "and"

Col. 7, line 12, change "alternative" to --alternate--

Col. 7, line 13, after "48" change "to" to --so--

Col. 8, line 48, change "in" to --to--

Col. 10, line 33, change "disposed" to --dispensed--

Signed and Sealed this

Twentieth Day of July 1976

[SEAL]

*Attest:*

RUTH C. MASON
*Attesting Officer*

C. MARSHALL DANN
*Commissioner of Patents and Trademarks*